United States Patent [19]
Hirota

[11] Patent Number: 5,211,010
[45] Date of Patent: May 18, 1993

[54] EXHAUST GAS PURIFICATION SYSTEM FOR A DIESEL ENGINE

[75] Inventor: Shinya Hirota, Susono, Japan

[73] Assignee: Toyota Jidosha Kabushiki Kaisha, Toyota, Japan

[21] Appl. No.: 810,727

[22] Filed: Dec. 18, 1991

[30] Foreign Application Priority Data

Dec. 26, 1990 [JP] Japan .................................. 2-413901

[51] Int. Cl.⁵ .............................. F01N 3/02; F01N 3/22
[52] U.S. Cl. ........................................ 60/280; 60/277;
                                              60/285; 60/301; 60/284; 60/286
[58] Field of Search ............... 60/277, 280, 285, 301,
                                              60/284, 286; 423/213.2

[56] References Cited

U.S. PATENT DOCUMENTS

| | | | |
|---|---|---|---|
| 4,233,811 | 11/1980 | Masaki et al. | 60/286 |
| 4,404,804 | 9/1983 | Tadokora et al. | 60/280 |
| 4,471,611 | 9/1984 | Watanabe | 60/285 |
| 4,934,142 | 6/1990 | Hayashi et al. | 60/297 |
| 5,021,227 | 6/1991 | Kobayashi et al. | 60/301 |
| 5,041,270 | 8/1991 | Fujitani et al. | 423/213.2 |

FOREIGN PATENT DOCUMENTS

| | | |
|---|---|---|
| 0010384 | 3/1980 | European Pat. Off. . |
| 3306484 | 11/1983 | Fed. Rep. of Germany . |
| 3925251 | 3/1990 | Fed. Rep. of Germany . |
| 2644845 | 9/1990 | France . |
| 61-112715 | 1/1986 | Japan . |
| 63-134810 | 10/1988 | Japan . |
| 1-130735 | 5/1989 | Japan . |
| 1-135541 | 5/1989 | Japan . |
| 1-139144 | 8/1989 | Japan . |

Primary Examiner—Ira S. Lazarus
Assistant Examiner—L. Heyman
Attorney, Agent, or Firm—Kenyon & Kenyon

[57] ABSTRACT

An exhaust gas purification system for a diesel engine 2 with a lean NOx catalyst 4 includes a temperature detecting means 6, an excess air ratio changing means 8 capable of changing an excess air ratio without changing a fuel injection amount, a control means for controlling the excess air ratio changing means 8 so as to increase the excess air ratio when the exhaust gas temperature is higher than an upper limit of a predetermined temperature range and to decrease the excess air ratio when the exhaust gas temperature is lower than a lower limit of a predetermined temperature range. In the exhaust gas purification system, the exhaust gas temperature can be controlled to the temperature range independently of the fuel injection amount.

7 Claims, 5 Drawing Sheets

EXHAUST GAS PURIFICATION SYSTEM FOR A DIESEL ENGINE

BACKGROUND OF THE INVENTION

1. Field of the Invention

The present invention relates to an exhaust gas purification system for a diesel engine with a catalyst installed in an exhaust conduit of the engine and constructed of zeolite carrying at least one kind of metal selected from the group consisting of transition metals and noble metals to reduce nitrogen oxides (NOx) included in exhaust gas from the engine under oxidizing gas conditions and in the presence of hydrocarbons (hereinafter, a lean NOx catalyst).

2. Description of the Prior Art

A lean NOx catalyst is known from, for example, Japanese Patent Publication No. HEI 1-130735 and Japanese Patent Publication No. HEI 1-135541.

The lean NOx catalyst can show a high NOx purification rate only in a certain temperature range (for example, 400° C.–550° C.). More particularly, if the catalyst temperature is higher than an upper limit of the temperature range, hydrocarbons (HC), which are necessary for reduction of NOx, included in the exhaust gas are oxidized, so that the amount of HC will be insufficient. In contrast, if the catalyst temperature is lower than a lower limit of the temperature range, the activity of the lean NOx catalyst is lost, so that the NOx purification rate of the lean NOx catalyst is decreased.

Since a diesel engine is operated at lean air-fuel ratios, that is, under oxidizing gas conditions, combination of the diesel engine and the lean NOx catalyst should be desirable. However, in a direct fuel injection-type diesel engine where fuel is directly injected into a cylinder of the engine, since the exhaust gas temperature increases in proportion to an increase in the fuel injection amount, there is only a narrow torque range where the lean NOx catalyst can show a high enough NOx purification rate to be usable. As a result, equipping a diesel engine with a lean NOx catalyst cannot be expected to produce a great improvement of the NOx purification rate.

SUMMARY OF THE INVENTION

An object of the present invention is to provide an exhaust gas purification system for a diesel engine having a high NOx purification rate over a wide engine operating range, by using means capable of controlling an intake air amount independently of a fuel injection amount to control exhaust gas temperature independently of engine torque.

The above-described object can be attained by an exhaust gas purification system for a diesel engine in accordance with the present invention. The system includes a diesel engine and an exhaust conduit of the diesel engine, a catalyst installed in the exhaust conduit and constructed of zeolite carrying at least one kind of metal selected from the group consisting of transition metals and noble metals to reduce nitrogen oxides included in an exhaust gas from the diesel engine under oxidizing gas conditions and in the presence of hydrocarbons, detecting means for detecting a catalyst temperature or a temperature corresponding to the catalyst temperature, excess air ratio changing means for changing an excess air ratio of the diesel engine without changing a fuel injection amount of the diesel engine, and means for controlling the excess air ratio changing means so as to increase the excess air ratio when the catalyst temperature detected by the detecting means is higher than an upper limit of a predetermined temperature range and to decrease the excess air ratio when the catalyst temperature detected by the detecting means is lower than a lower limit of the predetermined temperature.

The excess air changing means comprises, for example, a waste gate valve (WGV) and an opening and closing device for the waste gate valve, an intake air throttle valve and an opening and closing device for the throttle valve, or a swirl control valve (SCV) and an opening and closing device for the swirl control valve. The intake air amount can be changed without changing the fuel injection amount by controlling a WGV opening degree, a throttle valve opening degree, or an SCV opening degree, so that the excess air ratio can be controlled without materially changing engine torque. In this instance, when the intake air amount (the excess air ratio) is increased, the exhaust gas temperature lowers, and when the intake air amount is decreased, the exhaust gas temperature rises.

When the catalyst temperature is lower than a lower limit of the predetermined temperature range (for example, 400° C.–500° C.), the excess air ratio is controlled toward a small excess air ratio so that the exhaust gas temperature rises, while when the catalyst temperature is higher than an upper limit of the predetermined temperature range, the excess air ratio is controlled toward a large excess air ratio so that the exhaust gas temperature lowers. As a result, the exhaust gas temperature can be controlled to be within the predetermined temperature range independently of torque so that the NOx purification rate of the lean NOx catalyst can be raised without degrading the torque characteristic of the engine.

BRIEF DESCRIPTION OF THE DRAWINGS

The above and other objects, features, and advantages of the present invention will become more apparent and will be more readily appreciated from the following detailed description of the preferred embodiments of the invention taken in conjunction with the accompanying drawings, in which.

DETAILED DESCRIPTION OF THE PREFERRED EMBODIMENTS

Three preferred embodiments of the invention will be explained. These embodiments differ from each other in the choice of excess air ratio changing means. The excess air ratio changing means comprises a waste gate valve and an opening and closing device for the waste gate valve in the first embodiment, an intake air throttle valve and an opening and closing device for the throttle valve in the second embodiment, and a swirl control valve and an opening and closing device for the swirl control valve in the third embodiment. In any embodiment of the invention, a fuel injection amount and an excess air ratio are controlled by control routines stored in an engine control unit (ECU). Controls of the fuel injection and the excess air ratio are independent of each other so that the excess air ratio can be changed without changing the fuel injection amount. Since the routine for control of a fuel injection amount can be commonly used for any embodiment of the invention, the fuel injection amount control routine will be explained only in connection with the first embodiment.

FIRST EMBODIMENT

Figure 1:
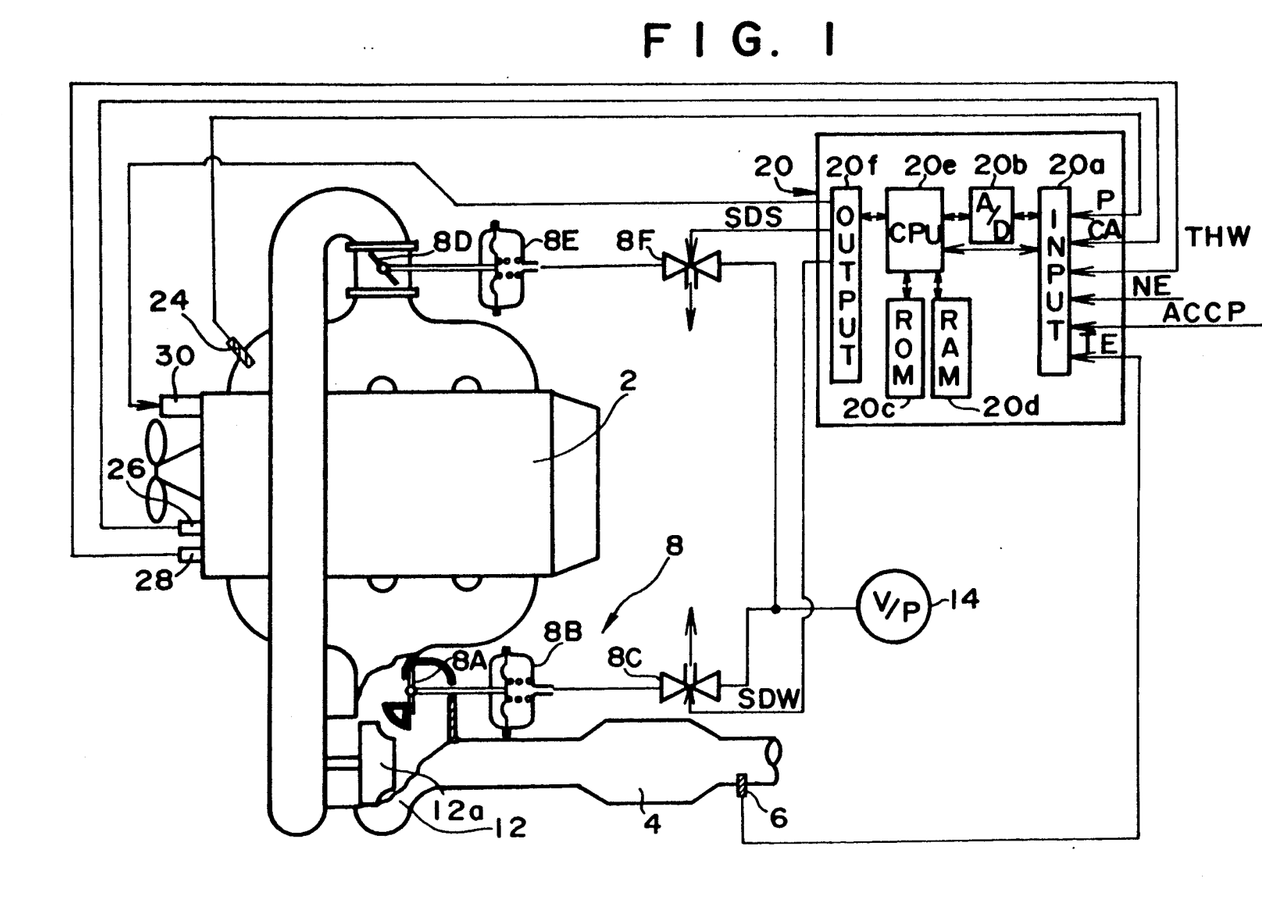
FIG. 1 is a schematic system diagram of an exhaust gas purification system for a diesel engine in accordance with any embodiment of the present invention.

As illustrated in FIG. 1, a diesel engine 2 is provided with a turbocharger 12 in which a turbine 12a is rotated by energy of the exhaust gas of the engine and drives a compressor coupled to the turbine. The diesel engine 2 has an exhaust conduit where a lean NOx catalyst 4 is installed so as to reduce and purify nitrogen oxides (NOx) included in the exhaust gas. An oxidizing catalyst or a three-way catalyst may be installed in the exhaust conduit of the engine downstream of the lean NOx catalyst 4. The lean NOx catalyst 4 has a temperature range where the catalyst 4 can show a high NOx purification rate. For the purpose of controlling the catalyst temperature to within the temperature range, it is necessary to detect the catalyst temperature or a temperature which changes corresponding to the catalyst temperature. For this reason, a temperature detecting means 6 for detecting a catalyst temperature or a temperature corresponding to the catalyst temperature is installed at the lean NOx catalyst or the gas outlet portion of the catalyst. In the embodiment of FIG. 1, an exhaust gas temperature sensor 6 is installed on a gas outlet side of the lean NOx catalyst 4.

A bypass conduit connects a first exhaust conduit portion upstream of the turbine 12a and a second exhaust conduit portion downstream of the turbine 12a to bypass the turbine 12a of the turbocharger 12. A waste gate valve (WGV) 8A is installed in the bypass conduit 12a and is opened and closed by a diaphragm-type actuator 8B. The actuator 8B is operated by a duty control solenoid valve 8C which can take any intermediate opening position between a full-open position and a full-closed position. The solenoid valve 8C can control a negative pressure acting on the actuator 8B to any pressure between the pressure of a negative pressure source 14 (a vacuum pump, a surge tank, or a negative pressure hold tank) and the atmospheric pressure.

More particularly, if the waste gate valve 8A is controlled toward the open position, a portion of the exhaust gas bypasses the turbine 12a, so that pressure-charging by the compressor of the turbocharger is decreased and the amount of intake air and the excess air ratio are decreased. In this connection, an excess air ratio is defined as the ratio of a current air-fuel ratio to a theoretical air-fuel ratio. In contrast, if the waste gate valve 8A is controlled to the closed side, the amount of intake air is increased and the excess air ratio also is increased. In the first embodiment, the waste gate valve 8A and the opening and closing device 8B and 8C of the waste gate valve 8A constitute the excess air ratio changing means 8.

An intake air throttle valve 8D is installed in an intake conduit of the engine, upstream of a surge tank. A diaphragm-type actuator 8E for opening and closing the throttle valve 8D is operated by a duty control solenoid valve 8F. The solenoid valve 8F can control the pressure acting on the actuator 8E to any negative pressure between the pressure of the negative pressure source 14 and the atmospheric pressure. More particularly, if the throttle valve 8D is controlled toward the open side, the amount of intake air is increased so that the excess air ratio is increased. In contrast, if the throttle valve 8D is controlled toward the closed side, the amount of intake air is decreased so that the excess air ratio also is decreased. Therefore, in the second embodiment, the throttle valve 8D and the opening and closing device 8E and 8F of the throttle valve 8D constitute an alternative or additional excess air ratio changing means 8.

Figure 4:
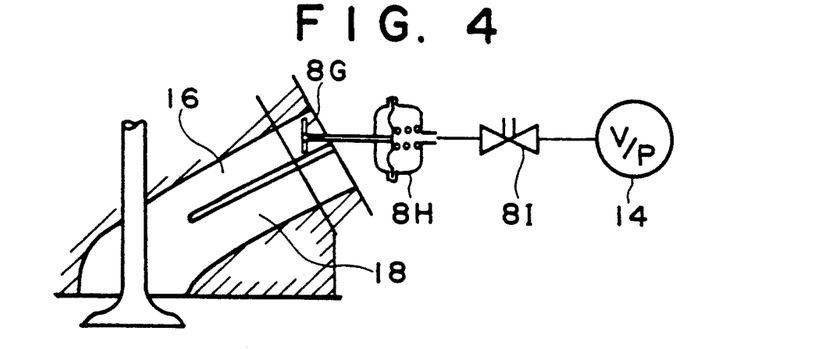
FIG. 4 is a cross-sectional view of an intake port of an exhaust gas purification system for a diesel engine in accordance with a third embodiment of the present invention.

Each intake port connected to each cylinder of the engine may have a swirl generation port (swirl port), as shown in FIG. 4. The intake port of this type usually includes a straight port 16, a swirl port 18, and a swirl control valve (SCV) 8G installed in the straight port 16. If the swirl control valve 8G is controlled toward the closed side, the amount of intake air flowing through the swirl port 18 is increased so that the flow resistance is large and the amount of intake air is relatively small. Since swirls are generated in the cylinder, the fuel is atomized and perfect combustion are promoted. The swirl control valve 8G is opened and closed by a diaphragm actuator 8H which is operated by a duty control solenoid valve 8I. The solenoid valve 8I controls the negative pressure acting on the actuator 8H to any pressure between a negative pressure of the negative pressure source 14 and the atmospheric pressure by changing connection of the actuator 8H to the pressure source or the atmosphere at arbitrary rates. Therefore, in the third embodiment, the swirl control valve 8G and the opening and closing device 8H and 8I of the swirl control valve 8G constitute another excess air ratio changing means.

Referring again to FIG. 1, the excess air ratio is controlled by a control means (not shown) for controlling the excess air ratio changing means. The control means includes at least a portion of a control routine that is stored in an engine control unit (ECU) 20.

The ECU 20 is constituted by a micro computer that includes an input interface 20a, an analog/digital (A/D) converter 20b, a read-only memory (ROM) 20c, a random access memory (RAM) 20d, a central processor unit (CPU) 20e, and an output interface 20f.

A signal P from a charging pressure detecting sensor 24, an accelerator opening degree signal ACCP from an accelerator pedal sensor (not shown), an engine speed signal NE from an engine speed sensor (not shown) mounted in a fuel injection pump, a crank angle signal CA from a crank angle sensor 26, a cooling water temperature signal THW from an engine cooling water temperature sensor 28, and an exhaust temperature TE from the exhaust gas temperature sensor 6 are fed to the input interface or the A/D converter of the ECU 20.

A fuel injection control signal which is one of the signals issued from the output interface of the ECU 20 is sent to a fuel injection pump 30, and a signal for controlling the excess air ratio changing means 8 is sent to at least one of the solenoid valves 8C, 8F, and 8I (FIG. 4).

In the ROM 20c of the ECU 20, programs and maps of FIGS. 2, 3, 5, and 6 are stored. Calculations based on these programs and maps are executed in the CPU 20e.

Figure 2:
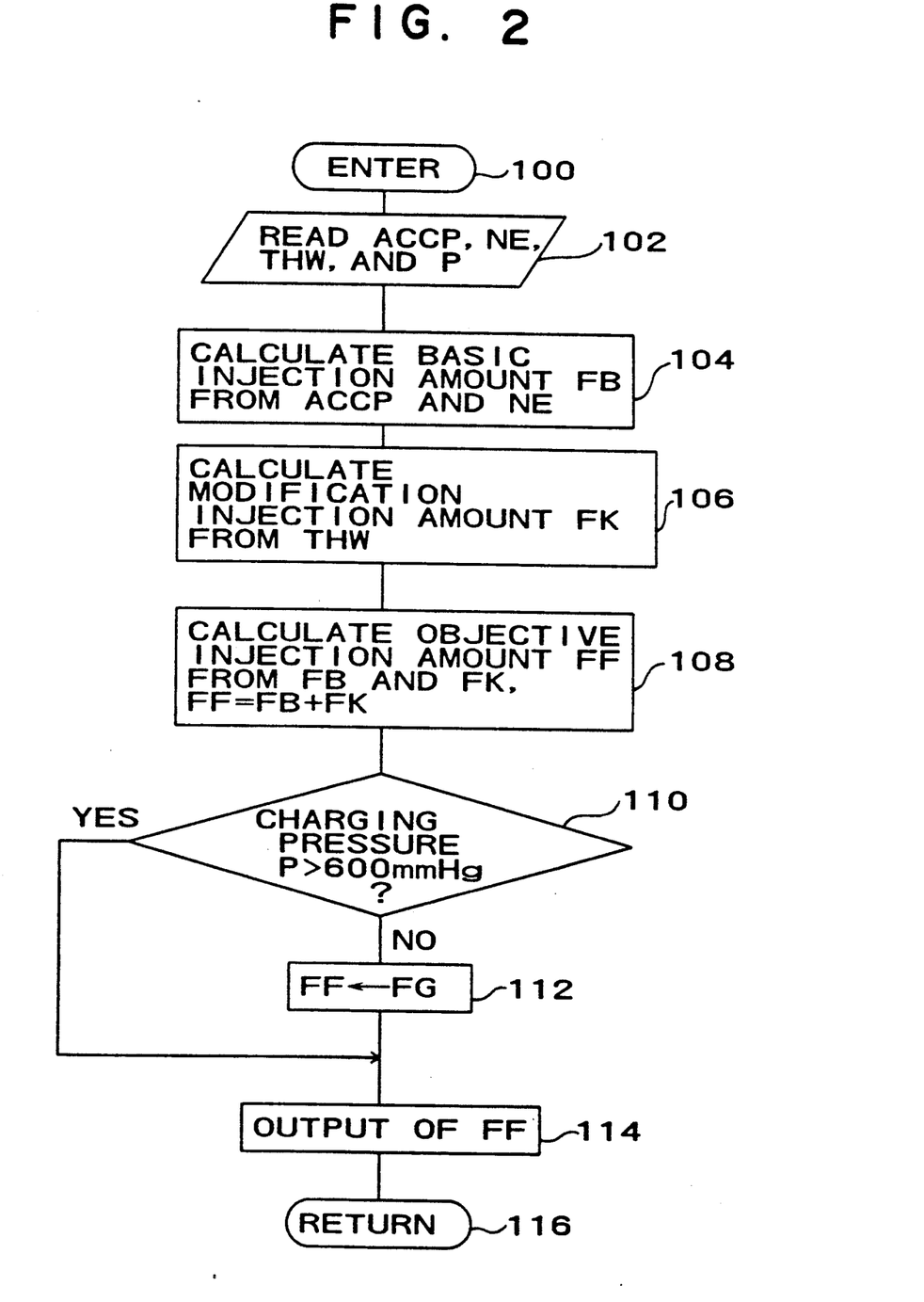
FIG. 2 is a flow chart of a fuel injection amount control routine applicable to any embodiment of the present invention.

FIG. 2 illustrates a routine for calculating a fuel injection amount, which can be used in any embodiment of the invention. The routine is entered at step 100 at every crank angle determined on the basis of the signals from the crank angle sensor 26. At step 102, the current accelerator opening degree signal ACCP, the engine speed signal NE, the engine cooling water temperature signal THW, and the charging pressure signal P are entered. Then, at step 104, a basic fuel injection amount FB is calculated based on the entered ACCP and NE. Then, at step 106, a modification fuel injection amount FK is calculated based on the cooling water temperature signal THW. Various modification fuel injection amounts may be calculated in addition to FK. Then, the routine proceeds to step 108, where an objective fuel injection amount FF is calculated using equation: $FF=FB+FK$. Then, the routine proceeds to step 110 for the purpose of modifying the fuel injection amount based on altitude.

More particularly, if the charging pressure signal P from the charging pressure detecting sensor 24 is not higher than 600 mmHg, the operating condition can be deemed to be at high altitudes, and the routine proceeds to step 112. At step 112, FF is set to a constant FG so that a fuel injection amount of more than FG is prevented, because if the total amount FF were injected, despite the lean air condition, the air-fuel ratio would be too rich.

If P is larger than 600 mmHg at step 110, the condition can be deemed to be at low altitudes, and the routine proceeds to step 114 where the total amount FF calculated at step 108 is injected. Then, the routine returns at step 116. A solenoid of an electro-magnetic spill valve of the fuel injection pump 30 operates in accordance with the FF signal of step 114 so that the fuel injection period of time of the fuel injection pump 30 is controlled.

It should be noted that the fuel injection amount FF is basically determined as a function of the accelerator pedal opening degree signal ACCP and the engine speed signal NE and is controlled independently of the intake air amount. Therefore, even if the intake air amount varies, the fuel injection amount is not affected by the variance of the intake air amount. As a result, the intake air amount (that is, the excess air ratio) can be controlled independently of the engine torque characteristic.

Figure 3:
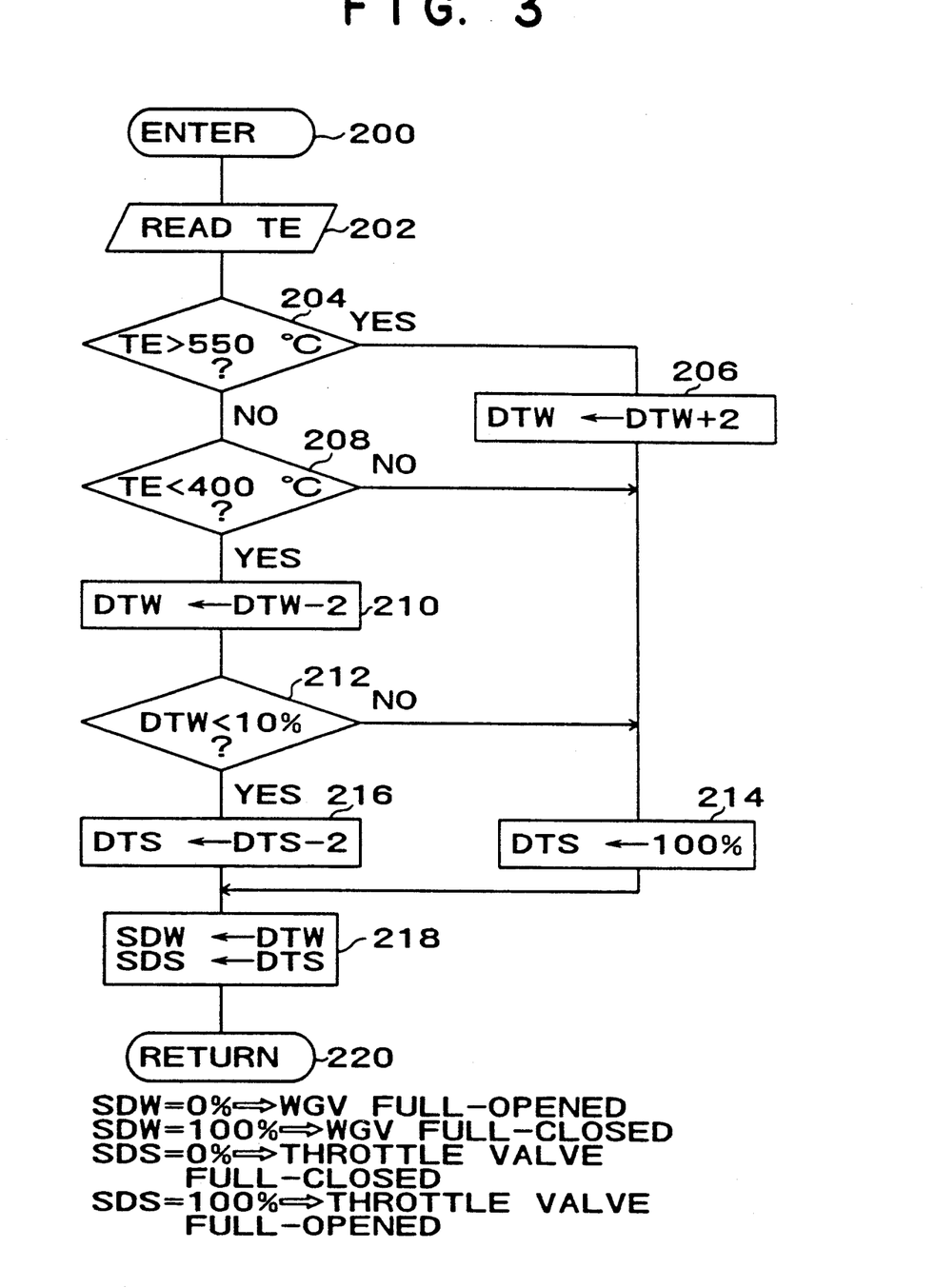
FIG. 3 is a flow chart of an excess air ratio control routine applicable to a first embodiment and a second embodiment of the present invention.

FIG. 3 illustrates a routine for controlling the excess air ratio. The routine is entered at step 200 at predetermined time periods or at every crank angle signal. At step 202, the exhaust gas temperature signal TE from the exhaust gas temperature sensor 6 is entered. Then, the routine proceeds to step 204 where it is determined whether or not the exhaust gas temperature TE is higher than an upper limit (for example, 550° C.) of a predetermined temperature range. If TE is higher than the upper limit of the predetermined temperature range, the current exhaust gas temperature should be lowered by increasing the intake air amount, and the routine proceeds to step 206. At step 206, the duty count DTW of the solenoid valve 8C is increased by a certain amount, for example by 2%, per calculation cycle so that the opening degree of the waste gate valve 8A is changed toward the closed side.

If TE is equal to or lower than the upper limit (for example, 550° C.) of the predetermined temperature range at step 204, the routine proceeds to step 208, where it is determined whether or not the exhaust gas temperature TE is lower than a lower limit, for example 400° C., of the predetermined temperature range. If TE is equal to or higher than the lower limit of the predetermined temperature range, the current exhaust gas temperature TE is within the predetermined temperature range, and the routine proceeds to step 214, where the intake air throttle valve 8D is controlled to its full-open position. If TE is lower than 400° C. at step 208, the routine proceeds to step 210, where the duty count DTW of the solenoid valve 8C is decreased by a certain amount, for example 2%, per calculation cycle so that the opening degree of the waste gate valve 8A is changed to the open side. Since the amount of intake air decreases in accordance with an increase in the opening degree of the waste gate valve 8A, the exhaust gas temperature rises. In this instance, the steps 204, 206, 208, and 210 constitute means for controlling the excess air ratio changing means in accordance with the first embodiment of the invention, which controls the excess air ratio by controlling the opening degree of the waste gate valve 8A.

DTW is decreased whenever the routine passes through step 210. If the decreasing DTW is determined to be equal to or more than 10% at step 212, the routine proceeds to 214. In contrast, if DTW is less than 10% at step 212, the exhaust gas temperature continues to be lower than 400° C. even though the opening degree of the waste gate valve 8A is near its full-open position, and the routine proceeds to step 216. At step 216, the duty count DTS of the solenoid valve 8F for controlling the throttle valve 8D is decreased by a certain amount, for example 2%, per calculation cycle so that the intake air throttle valve 8D is controlled toward the closed side.

In this instance, when the routine proceeds to step 214, the exhaust gas temperature can be controlled to the predetermined temperature range by controlling the waste gate valve 8A only, and the opening degree of the throttle valve 8D does not need to change toward the closed side for the purpose of controlling the exhaust gas temperature. However, when the routine proceeds to step 216, the exhaust gas temperature cannot be controlled to the predetermined temperature range by controlling the waste gate valve 8A only, and therefore the throttle valve 8D also is controlled toward the closed side so that the exhaust gas temperature is raised. Then, the routine proceeds to step 218 from either one of steps of 214 and 216. At step 218, the opening degree SDW of the waste gate valve 8A is set at DTW and the opening degree SDS of the throttle valve 8D is set at DTS. Then, the routine proceeds to step 220 and returns. In this instance, the steps 212, 214, and 216 can control the excess air ratio by controlling the opening degree of the throttle valve 8D and constitute means for controlling the excess air ratio changing means in a second embodiment of the invention as will be explained hereinafter.

In the first embodiment, when the current exhaust gas temperature is higher than the upper limit of the predetermined temperature range (for example, 400° C.–550° C.), the waste gate valve 8A is controlled toward the closed side so that the turbine speed is increased and the amount of intake air is increased. As a result, the excess air ratio is increased and the exhaust gas temperature is lowered without changing the fuel injection amount, so that the exhaust gas temperature is returned to the predetermined temperature range. In contrast, when the exhaust gas temperature is lower than the lower limit of the predetermined temperature range, the waste gate valve 8A is controlled toward the open side, and the exhaust gas temperature is raised. When the exhaust gas temperature is within the predetermined temperature range, the opening degree of the waste gate valve 8A is not changed.

SECOND EMBODIMENT

In the second embodiment, the exhaust gas temperature is controlled independently of the fuel injection amount by duty-controlling the opening degree of the intake air throttle valve 8D. FIGS. 1, 2, and 3 are also applied to the second embodiment, and especially, the steps 212, 214, and 216 of FIG. 3 are specific to the second embodiment. In the second embodiment, the throttle valve 8D and the opening and closing device 8E and 8F of FIG. 1 constitute an excess air ratio changing means 8, and the steps 21, 214, and 216 constitute means for controlling the excess air ratio changing means.

In the second embodiment, when the exhaust gas temperature is lower than the lower limit of the predetermined temperature range, the throttle valve 8D is controlled toward the closed side so that the amount of intake air is decreased independently of the fuel injection amount and the exhaust gas temperature is increased. When the exhaust gas temperature is within the predetermined temperature range or higher than the upper limit of the predetermined temperature range, the throttle valve 8D is controlled to its full-open position.

THIRD EMBODIMENT

Figure 5:
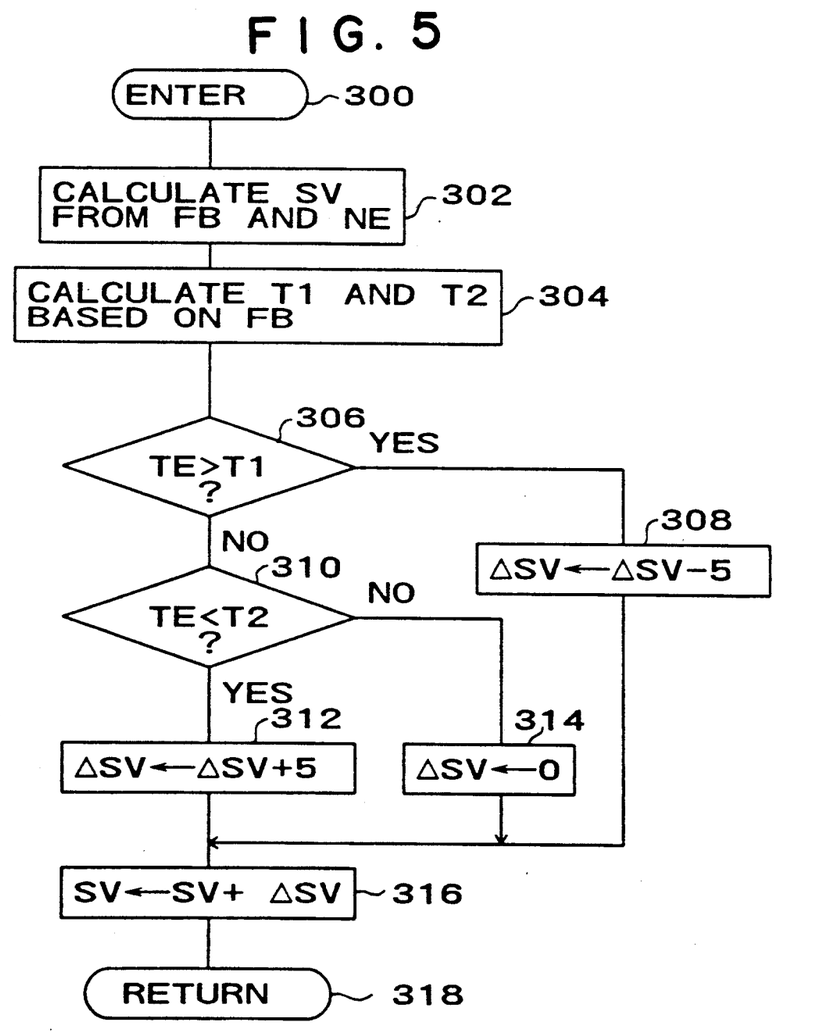
FIG. 5 is a flow chart of an excess air ratio control routine applicable to the third embodiment of the present invention.
Figure 6:
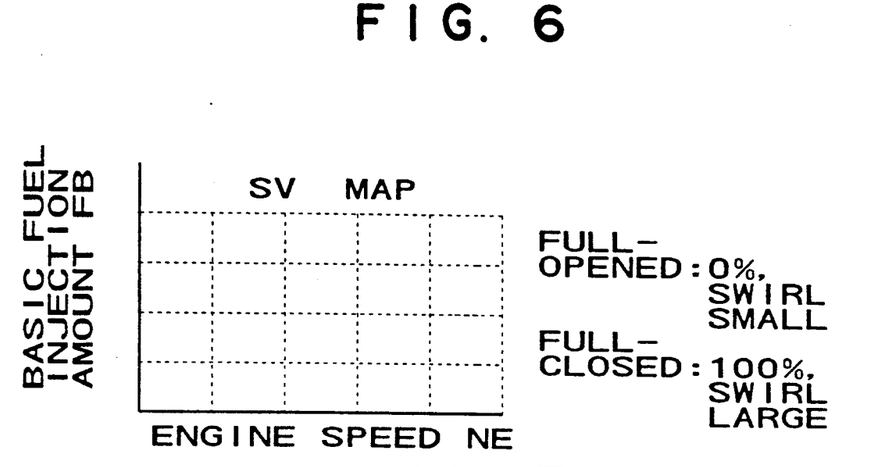
FIG. 6 is a graphical representation of a map of basic fuel injection amount versus engine speed used for calculation in the flow chart of FIG. 5.
Figure 7:
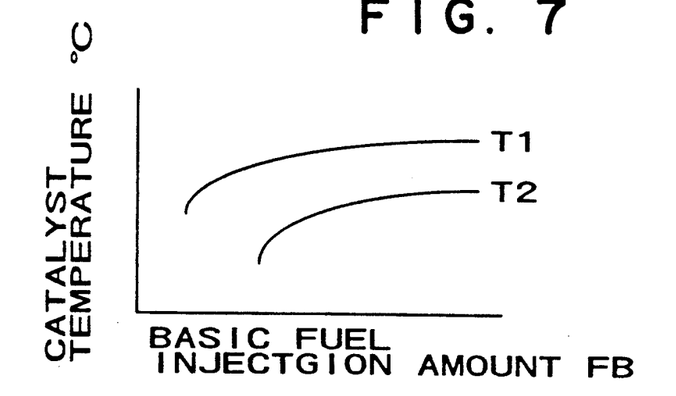
FIG. 7 is a graphical representation of a map of temperature range versus basic fuel injection amount used for calculation in the flow chart of FIG. 5.

In the third embodiment, the exhaust gas temperature is controlled independently of the fuel injection amount by duty-controlling the opening degree of the swirl control valve 8D. FIGS. 1, 2, and 4 are also applied to the third embodiment. FIGS. 5 and 6 illustrate a routine and a map specifically applied to the third embodiment.

In FIG. 4, since the swirl control valve 8G is closed at low and medium engine loads, the intake air flows through the swirl port 18 into a combustion chamber to generate swirls in the combustion chamber so that fuel is atomized and mixed with air and good combustion and fuel economy are obtained. In contrast, at high engine loads, since the flow resistance of the swirl port 18 increases and the power characteristic of the engine decreases, the swirl control valve 8G is controlled toward the open side and a large amount of intake gas is introduced into the combustion chamber through the straight port 16 also.

Figure 8:
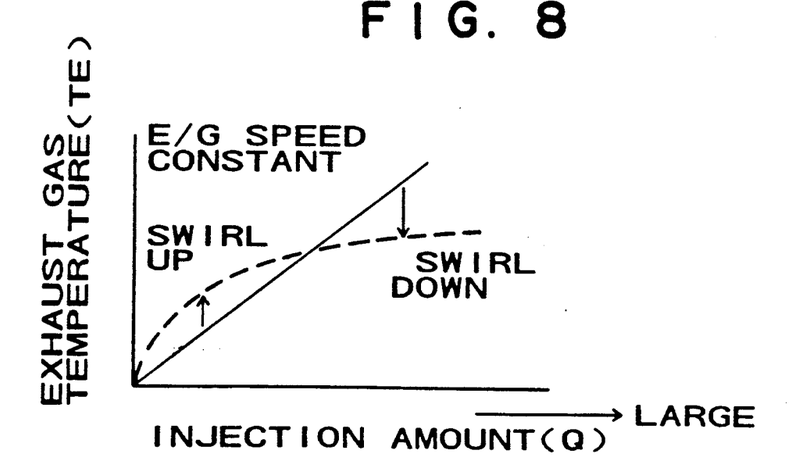
FIG. 8 is a graphical representation of a map of exhaust gas temperature versus fuel injection amount used for calculation in the third embodiment.

In general, as illustrated by a full line in FIG. 8, the exhaust gas temperature TE increases in proportion to an increase in the fuel injection amount Q in a diesel engine having no variable swirl mechanism. However, in a diesel engine with a variable swirl mechanism, as illustrated by a broken line in FIG. 8, increase in the exhaust gas temperature by an increase in the swirl strength and decrease in the exhaust gas temperature by a decrease in the swirl strength are possible. Therefore, the exhaust gas temperature can be controlled by changing the opening degree of the swirl control valve 8G to change the excess air ratio independently of the fuel injection amount. In this instance, the swirl control valve 8G and the opening and closing device 8H and 8I of the swirl control valve constitute an excess air ratio changing means 8 of the third embodiment of the invention.

FIG. 5 illustrates a routine for controlling the exhaust gas temperature by controlling the opening degree of the swirl control valve 8G. This routine is stored in the ROM 20c of the ECU 20 of FIG. 1, and calculation according to the routine is executed at the CPU 20e.

The routine is entered at step 300 at predetermined time periods or at every crank angle. At step 302, an opening degree of the swirl control valve is calculated from the current engine speed NE and the basic fuel injection amount FB (FIG. 2), using an SV (duty count of the swirl control valve) map as shown in FIG. 6. The SV value is large (which corresponds to the closed side and generates strong swirls) at low engine speeds and small basic fuel injection amounts and is small (which corresponds to the open side and generates weak swirls) at high engine loads and large basic fuel injection amounts. Then, at step 304, an upper limit T1 and a lower limit T2 of a predetermined temperature range is calculated based on the basic fuel injection amount FB. Though T1 and T2 correspond to 550° C. and 400° C., respectively, discussed in the first and second embodiments, T1 and T2 changes according to the fuel injection amount.

Then, at step 306, it is determined whether or not the current catalyst temperature or the temperature corresponding to the catalyst temperature TE is higher than T1. If TE is higher than T1, the routine proceeds to step 308, where the duty count SV of the swirl control valve 8G is decreased by a predetermined amount, for example 5%, per calculation cycle, so that the swirl control valve is controlled toward the open side and the exhaust gas temperature is decreased. If TE is equal to or lower than T1, the routine proceeds to step 310, where whether or not TE is lower than T2 is determined. If TE is equal to or higher than T2, TE is between T1 and T2, and the routine proceeds to step 314 without changing the duty count. If TE is lower than T2 at step 310, the routine proceeds to 312, where the duty count SV is increased by a predetermined amount, for example 5%, per calculation cycle, so that the swirl control valve 8G is controlled toward the closed side and the swirl is strengthened, resulting in an increase in the exhaust gas temperature TE. Then, at step 316, the calculated SV is set, and then the routine proceeds to step 318 and returns. The steps 306, 308, 310, 312, 314, and 316 constitute means 10 for controlling the excess air ratio changing means in accordance with the third embodiment of the present invention.

In the third embodiment, when the current exhaust gas temperature is higher than the upper limit of the temperature range (T1–T2) determined based on the fuel injection amount, the swirl control valve 8G is controlled toward the open side so that the amount of intake air and the excess air ratio are increased and the exhaust gas temperature is lowered. When the current exhaust gas temperature is in the temperature range (T1–T2), the opening degree of the swirl control valve 8G is not required to be changed from the viewpoint of exhaust gas temperature control. When the current exhaust gas temperature is lower than the lower limit of the temperature range (T1-T2), the swirl control valve is controlled toward the closed side so that the exhaust gas temperature is raised.

In the present invention, since the temperature detecting sensor 6, the excess air ratio changing means 8, and the means 10 for controlling the excess air ratio changing means are provided to the diesel engine 2 having the lean NOx catalyst 4 in the exhaust conduit, the exhaust gas temperature can be controlled to a predetermined temperature range independently of the fuel injection amount by increasing the excess air ratio when the exhaust gas temperature is higher than the upper limit of the temperature range and by decreasing the excess air ratio when the exhaust gas temperature is lower than the lower limit of the temperature range. As a result, the NOx purification rate of the lean NOx catalyst 4 can be maintained high.

Although a few embodiments of the invention have been described in detail above, it will be appreciated by those skilled in the art that various modifications and alterations can be made to the particular embodiments shown without materially departing from the novel teachings and advantages of the present invention. Accordingly, it is to be understood that all such modifications and alterations are included within the spirit and scope of the present invention as defined by the following claims.

What is claimed is:

1. An exhaust gas purification system for a diesel engine comprising:
    a diesel engine having an exhaust conduit;
    a catalyst installed in the exhaust conduit of the diesel engine and constructed of zeolite carrying at least one kind of metal selected from the group consisting of transition metals and noble metals to reduce nitrogen oxides included in exhaust gas from the diesel engine under oxidizing gas conditions and in the presence of hydrocarbons, wherein, when a temperature of said catalyst is within a predetermined temperature range, said catalyst reduces $NO_x$ at a rate which is relatively higher than the rate at which $NO_x$ is reduced when the temperature of said catalyst is outside the predetermined temperature range;
    detecting means for detecting one of a catalyst temperature and a temperature corresponding to the catalyst temperature;
    excess air ratio changing means for changing an excess air ratio of the diesel engine independently of a fuel injection amount of the diesel engine so that an exhaust gas temperature is changed independently of an engine torque; and
    control means for controlling the excess air ratio changing means so as to increase the excess air ratio when the catalyst temperature detected by the detecting means is higher than an upper limit of the predetermined temperature range in order to decrease the exhaust gas temperature and, consequently to decrease the catalyst temperature independently of the engine torque and to decrease the excess air ratio when the temperature detected by the detecting means is lower than a lower limit of the predetermined temperature range to increase the exhaust gas temperature and, consequently, to increase the catalyst temperature independently of the engine torque, so that the catalyst temperature is maintained within the predetermined temperature range.

2. An exhaust gas purification system for a diesel engine according to claim 1, wherein the diesel engine includes a turbocharger that has a waste gate valve installed in a bypass conduit bypassing a turbine of the turbocharger, and the excess air ratio changing means comprises the waste gate valve and an opening and closing device for the waste gate valve.

3. An exhaust gas purification system for a diesel engine according to claim 2, wherein the opening and closing device of the waste gate valve includes a diaphragm actuator coupled to the waste gate valve, a negative pressure source connected to the actuator, and an electro-magnetic duty control solenoid valve installed in a conduit connecting the actuator and the negative pressure source.

4. An exhaust gas purification system for a diesel engine according to claim 1, wherein the excess air ratio changing means comprises an intake air throttle valve and an opening and closing device for the throttle valve.

5. An exhaust gas purification system for a diesel engine according to claim 4, wherein the opening and closing device of the intake air throttle valve includes a diaphragm actuator coupled to the intake air throttle valve, a negative pressure source connected to the actuator, and an electro-magnetic duty control solenoid valve installed in a conduit connecting the actuator and the negative pressure source.

6. An exhaust gas purification system for a diesel engine according to claim 1, wherein each cylinder of the diesel engine has a straight intake port and a swirl generating intake port, and the excess air ratio changing means comprises a swirl control valve installed in the straight intake port and an opening and closing device for the swirl control valve.

7. An exhaust gas purification system for a diesel engine according to claim 6, wherein the opening and closing device of the swirl control valve includes a diaphragm actuator coupled to the swirl control valve, a negative pressure source connected to the actuator, and an electro-magnetic duty control solenoid valve installed in a conduit connecting the actuator and the negative pressure source.

* * * * *